June 14, 1966  J. BURNHAM ET AL  3,256,382
SEAL CONSTRUCTIONS FOR ELECTRICAL DEVICES
Filed Dec. 13, 1960
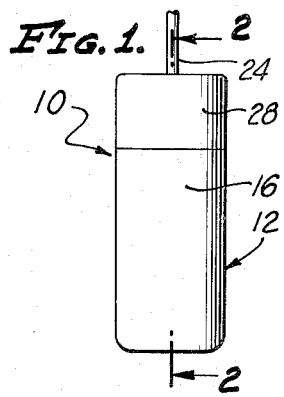
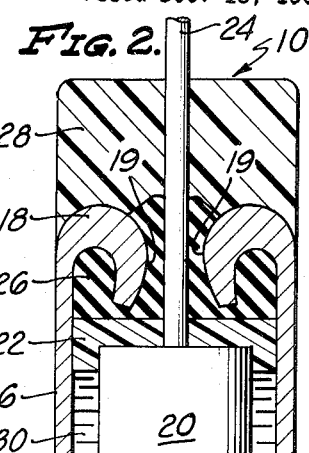
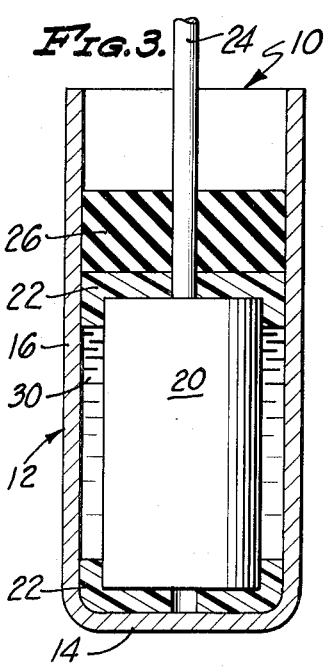
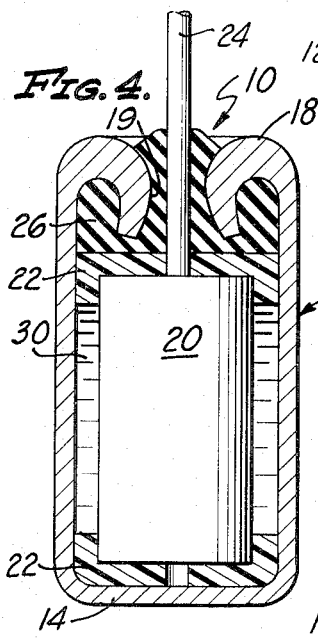
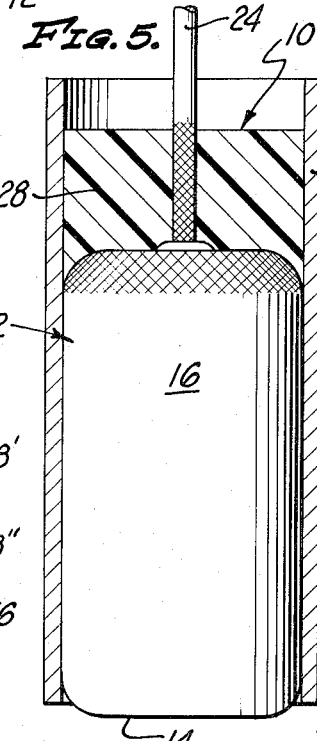
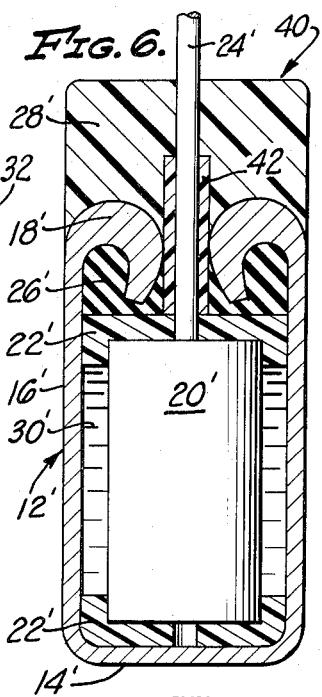
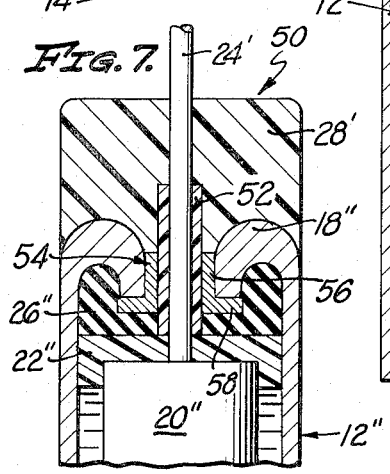
INVENTORS
JOHN BURNHAM,
STANLEY E. JOHNSON
BY O'BRIAN & BLACKHAM
ATTORNEYS

United States Patent Office 3,256,382
Patented June 14, 1966

3,256,382
SEAL CONSTRUCTIONS FOR ELECTRICAL
DEVICES
John Burnham, 10960 Verano Road W., Los Angeles 24, Calif., and Stanley E. Johnson, 25 Ardor Drive, Orinda, Calif.
Filed Dec. 13, 1960, Ser. No. 75,490
4 Claims. (Cl. 174—17.05)

This invention pertains to new and improved seal constructions, and more specifically to seals for small liquid containing electrical devices such as electrolytic capacitors.

At the present time many electrolytic capacitors are manufatured using an inert metal can serving as a housing and as an electrode. With this type of structure such a housing holds a capacitor anode and an electrolyte placing the housing and such another electrode in electrical communication with one another. In order to insure satisfactory capacitor performance a seal is used in order to prevent the escape of the electrolyte from the can around a conductor leading to the anode employed.

Such escape of electrolyte can be caused by a number of different factors. Electrolytic capacitors are, of course, used in various different positions in which drainage of electrolyte might normally occur. In addition, they are used at extreme temperature conditions where a tendency toward electrolyte vaporization is a very material factor. If significant amounts of electrolyte escape from an electrolytic capacitor obviously the performance of such a unit is affected. Further, the electrolytes used in many types of electrolytic capacitors are of an extremely corrosive character. Because of this electrolyte leakage or escape must be prevented at virtually all costs in many electrolytic capacitors.

A number of efforts have, of course, been made in order to provide satisfactory seals for electrolytic capacitors. It is quite common at the present time to form electrolytic capacitors using flanges and washers which are deformed against one another so as to create a seal. Seals of this category are, as a general rule, considered undesirable for many applications because of the fact that the structures involved with them are comparatively bulky and add materially to the physical dimensions of an electrolytic capacitor. Further, this type of construction is considered to be comparatively expensive to create. Other attempts have been made to provide sealed electrolytic capacitors by deforming or crimping housing members against various types of washers. Prior efforts along these general lines are not considered to have supplied the need for effective, inexpensive seals for electrolytic capacitors, because of the cost and/or performance factors.

An object of the present invention is to provide new and improved seal constructions which are considered to fulfill the presently existing need for effective seals in the electrolytic capacitor art. Another object of the present invention is to provide new and improved seals for electrical devices containing liquids, which seals are capable of being easily and conveniently created at a comparatively nominal expense and which provide effective protection against leakage. A still further object of the present invention is to provide in units of the class indicated seals of a comparatively nominal dimension,which seals do not interfere with these units being easily installed upon printed circuit mountings of various types.

These and various other objects of this invention as well as many specific advantages of it will be more fully apparent from a detailed consideration of the remainder of this description including the appended claims and the accompanying drawing in which:

FIG. 1 is a side elevational view of an electrolytic capacitor employing a seal construction of this invention;

FIG. 2 is a cross-sectional view of the electrolytic capacitor shown in FIG. 1 taken at line 2—2;

FIGS. 3, 4 and 5 are views similar to FIG. 2 showing various stages or operations during the formation of the seal constructions as indicated in FIG. 2; and FIG. 6 is a cross-sectional view similar to FIG. 2 of an electrolytic capacitor utilizing a modified seal construction of this invention;

FIG. 7 is a cross-sectional view similar to FIG. 2 of an electrolytic capacitor utilizing another modified seal construction of this invention.

As an aid to understanding this invention it can be stated in essentially summary form that it concerns seal constructions in devices such as electrolytic capacitors which have a cylindrical, ductile metal housing, a member located within such a housing, and a conductor extending from the member out of the housing. A seal construction of this invention employs an elastomeric washer disposed within the opening to such a houisng around the conductor extending out of it and a continuous internally directed flange disposed so as to hold the washer under compression and so as to define a comparatively small diameter opening out of the housing around the conductor. A seal construction of this invention preferably also includes a non-conductive solid material firmly adhered to at least part of the housing and to the conductor, this material completely enclosing or encompassing the opening defined by the flange employed.

This type of structure is best more fully explained by referring directly to the accompanying drawing. In the initial figures of this drawing there is shown an electrolytic capacitor 10 of the present invention which employs a cup-like ductile metal housing 12 serving as a cathode within this unit. This housing 12 includes a bottom wall 14 and a continuous cylindrical side wall 16 which terminates in an internally directed, curved continuous flange 18. The extremity of this flange 18 and the wire 24 define a restricted toroidal opening 19, and is directed generally toward the bottom wall 14.

Within the interior of the housing 12 a conventional type of anode 20 of a rigid character is held out of contact with the housing 12 by means of identical inert, cup-like non-conductive spacers 22. As shown in the drawing the anode 20 is preefrably of a cylindrical form and is spaced co-axially within the wall 16 by means of the spacers 22. Attached to the anode 20 as by welding or the like is a cylindrical wire conductor 24 which extends out through the end of the housing 12 remote from the bottom wall 14 within the interior of the flange 18. This flange 18 is in direct contact with an elastomeric, electrically non-conductive washer 26 so as to hold this washer under compression against the interior of the housing 12 and against the interior of the conductor 24 and against the spacer 22 located adjacent to it. Preferably the flange 18 serves to hold this washer 26 so that the compression against the conductor 24 immediately within the flange 18 is greater than the amount of compression achieved elsewhere in this washer 26.

In order to complete the seal employed in the capacitor 10 preferably a small generally cylindrical body 28 of inert, electrically non-conductive plastic material is caused to adhere to at least part of the housing 12 and to the conductor 24. This body 28 completely surrounds and encompasses the interior of the flange 18 around the conductor 24 so as to prevent any possibility of either vapor and/or fluid from passing to the exterior of the capacitor 10.

The type of construction described in the preceding description of the capacitor 10 may be created with a minimum amount of difficulty at a comparatively low expense as indicated by FIGS. 3, 4 and 5 of the drawing. In creating the capacitor 10 the spacers 22 and the anode 20 may be located within the housing 12 as indicated in FIG. 3 and an appropriate electrolyte 30 may be located within the housing so as to fill the area generally occupied by the spacers 22 and this anode 20. Next the washer 26 may be inserted as indicated in FIG. 3. Preferably the washer 26 should be of such initial dimension as to fit closely against the interior of the housing 12 and so as to fit closely against the outside of the conductor 24, although, if desired, the washer 26 may be formed so that its external diameter is slightly less than the internal diameter of the side wall 16 and so that the hole within its center is slightly larger than the outer diameter of the conductor 24.

When the various parts shown in FIG. 3 have been assembled as indicated in this figure the flange 18 may be conveniently created to a shape as indicated in FIGS. 2 and 4 of the drawing by a comparatively simple type of metal spinning operation or by other techniques. During such a spinning operation a spinning tool is brought against the extremity of the wall 16 of the housing 12 so as to gradually deform this side wall 16, creating a comparatively restricted opening 19 which, as shown in FIG. 4 extends around the conductor 24. Preferably this opening 19 is only of slightly larger dimension than the outer diameter of the conductor 24. In forming the capacitor 10 the flange 18 is preferably created from the side wall 16 using the spinning technique as indicated so that the extremity of this flange is gradually forced into the upper surface of the washer 26 remote from the anode 20. This causes a portion of the washer 26 to be deformed so as to extend along the conductor 24 and to fit against what may be considered the outside of the flange 18. This has the effect of insulating the conductor 24 from the flange 18.

In creating the complete capacitor 10 the housing 12 is next surrounded by a cylindrical sleeve 32 as indicated in FIG. 5 of the drawing. This sleeve serves to define a mold which is adapted to retain the material composition from which the body 28 is created as this material is located and "formed" upon the flange 18. If desired, the external surfaces of the portion of the housing 12 defining the flange 18 and the conductor 24 may be roughened, knurled or similarly processed so as to improve the adhesion of the body 28 to these parts of the capacitor 10. If desired a mounting wire or the like may be attached to the housing 12 as by welding before or after any of the operations herein described.

A number of different materials may be used in creating the capacitor 10. Preferably the housing 12 is formed out of a comparatively ductile, inert metal such as silver so as to have substantially constant uniform wall thickness except within the area of the flange 18. It will be realized that metals such as silver are comparatively soft, and that for this reason it is difficult to normally establish a flange from such metals exerting constant force so as to form a satisfactory seal. When the capacitor 10 is formed as by spinning or other equivalent techniques preferably the portion of the side wall 16 used to create the flange 18 is thickened by such an operation to a shape of the type indicated in FIGS. 2 and 4 of the drawing as a result of the forming operation so as to be materially thicker than the initial wall from which this flange was created. As a consequence of such thickness within the flange 18, this flange is sufficiently strong so as to be capable of exerting sufficient constant force so as to hold the washer 26 under compression at all times. Preferred results in accordance with this invention have been achieved by forming the flange 18 so that it is at least two times as thick as the wall 16 from which this flange 18 is created.

A number of materials may also be used in forming the elastomeric washer 26. Preferably this washer is formed out of a material as a known type of silicone rubber, polytrifluorochloroethylene or various other equivalents such as are well known at the present time. Elastomers as are used within the capacitor 10 should, of course, be of such character as to be inert with respect to the electrolyte 30 to be employed under the temperature conditions normally encountered in use. This electrolyte 30 may consist of a saturated aqueous solution of lithium chloride, concentrated sulphuric acid or various other compositions.

The spacers 22 may conveniently be formed out of virtually any inert, stable material such as various known thermoplastic compositions. The anode 20 may, of course, be of any common known variety. Preferably this anode 20 is of a rigid character. The invention has been successfully used with so-called sintered tantalum anodes. Various analogous anodes may also be employed. The metal conductor 24 utilized should, of course, be of an inert character.

The body 28 utilized in completing a preferred capacitor of this invention may be formed out of a wide variety of different compositions capable of securely bonding the housing 12 and the conductor to one another. It is presently preferred to utilize with the invention known so-called "epoxy" type compositions formed by condensing epichlorohydrin with bis-phenol-A. Compositions of this general type are normally admixed with an amine type catalyst so as to form a liquid intermediate composition capable of hardening in a mold such as the sleeve 32 either at room or elevated temperature after being poured into such a mold so as to form a solid body capable of bonding to metal. Various other equivalent materials may, of course, be employed in creating the body 28.

When a capacitor such as the capacitor 10 is formed as indicated in the preceding discussion a hermetic seal preventing the escape of electrolyte such as the electrolyte 30 is achieved. With this type of construction the comparatively small or restricted diameter of the opening 19 provides only a small area through which leakage is even theoretically possible. This small area is considered to be particularly important with respect to the escape of vapor from the electrolyte 30. Further, the body 28 utilized effectively bonds the entire top area of the capatitor 10 so that deformation of this area which might be caused by metal bending or otherwise deforming or losing its strength at elevated temperature is effectively prevented. The body 28 also acts to prevent the escape of either liquid or vapor by effectively holding the conductor 24 with respect to the housing 12 in the capacitor 10. By virtue of the general type of construction employed in this capacitor 10 the type of sealing structure herein explained can be effectively applied so as to create satisfactory seals with electrical devices such as electrolytic capacitors of various different external diameters.

In FIG. 6 of the drawing there is shown a modified electrolytic capacitor 40 of the present invention which is very similar in construction to the capacitor 10 previously described. Because of such similarity various parts of the capacitor 40 which are either identical to or substantially identical to the parts of the capacitor 10 previously described are not separately described herein and are designated in the remainder of this specification and in the drawing by the primes of the numerals previously used.

The capacitor 40 differs from the capacitor 10 in that a small, cylindrical, electrically non-conductive, inert sleeve 42 is disposed around the conductor 24' so as to extend completely through the flange 18'. This sleeve 42 may be either formed directly upon the conductor 24' or may be formed so as to be of substantially the same or slightly smaller diameter as the conductor 24' and may be fitted upon this conductor 24'. In the capacitor 40 this flange 18' is formed in such a manner as to bear directly against the exterior of the sleeve 42 holding the entire elastomeric washer 26' beneath this flange against a spacer 22'. The sleeve 42 of course prevents electrical contact from being established between the flange 18' and the conductor 24'. The body 28' serves to hold the flange 18' with respect to this conductor 24' in the same general manner as previously indicated. This body 28' completely encloses and covers the sleeve 42 shown.

In FIG. 7 of the drawing there is shown a still further modified electrolytic capacitor 50 of this invention. This other capacitor 50 is very closely related to the capacitors 10 and 40 previously described. Because of such similarity various parts of the capacitor 50 which are the same or substantially the same as various parts of the capacitor 10 are not separately described herein, and are designated in the remainder of this specification and in the drawing by the double primes of the numerals previously employed.

The capacitor 50 utilizes a small, comparatively thin electrically non-conductive, cylindrical, inert sleeve 52 formed of polytetrafluoroethylene or the equivalent which corresponds to the sleeve 42 previously described. This sleeve is disposed around a conductor 24" leading out through the flange 18" formed upon the housing 12". The sleeve 52 in this construction carries a small eyelet 54 having a cylindrical center section 56 which fits tightly against the sleeve 52 but which is capable of being moved along the sleeve 52 without disrupting or breaking it up. The eyelet 54 also includes an extending flange 58 located on the end of the center section 56 closest adjacent to the anode 20" in this capacitor 50.

During the formation of the capacitor 50 the eyelet 54 is located in place upon the sleeve 52 and the conductor 24" prior to the formation of the flange 18" so that the flange 58 rests against the elastomeric washer 26" utilized. Next the flange 18" is formed as previously described. During the formation process the innermost extremity of this flange 18" is forced upon and against the exterior of the center section 56 and against a side of the flange 58 to a configuration as indicated in FIG. 7. As this occurs the washer 26" is deformed so as to completely fill the area or region between the spacers 22'", this flange 18" and the eyelet 54 so as to be held under compression substantially as previously described. The force necessary to deform the wall 16" of the housing 12" in order to form the flange 18" and in order to compress the washer 26" in this manner is normally sufficient to, in effect, create what amounts to a firm, adherent bond between the exterior of the eyelet 54 and the flange 18". Preferably after the flange 18" has been formed as indicated a body 28" as previously indicated is created so as to bond the conductor 24" to the exterior of the housing 12" as shown in FIG. 7.

Those skilled in the art to which this invention pertains will realize that seals constructed as herein described are very effective for the purposes intended. Electrolytic capacitors constructed in the general manner illustrated in the drawing have been subjected to sufficient heat so as to cause vaporization of the electrolyte used in them to a point where the housings in these units ruptured before leakage around the seals employed in these units occurred. It is considered very significant that with the invention gaseous vapor diffusion is held to what is considered to be virtually an irreducible minimum. This is related to the fact that the flanges used in the seals of this invention are formed so as to cut down the area through which such diffusion can occur to a very low value.

In this specification reference has been made to the bodies 28, 28' and 28" being bonded to the flanges 18, 18' and 18", respectively. Since these flanges are all formed as parts of the housings 12, 12' and 12" in the particular capacitors indicated these bodies bond the conductors 24, 24' and 24" to the housings 12, 12' and 12", respectively. If desired, any capacitor constructed as indicated in this specification can be formed so that a particular body such as the body 28 covers and adheres to any desired amount of the surface of the housing in such a unit.

Because of the nature of this invention it is to be considered as being limited solely by the appended claims forming a part of this disclosure.

What is claimed is:
1. In an electrical device having a cylindrical housing formed of a ductile metal, a member positioned within said housing, a conductor attached to said member so as to extend therefrom through an end of said housing, and a liquid located within said housing, a seal for said end of said housing which includes:
    an elastomeric, inert washer supported on said member;
    a continuous internal flange formed on said end of said housing, said flange being curved so that the internal edge thereof is directed generally toward the interior and the bottom of said housing, said flange fitting tightly against said elastomeric washer so as to deform said washer from its normal uncompressed configuration to a compressed configuration in which said washer fits tightly against the interior of said housing adjacent to said end and with respect to said conductor and against said flange;
    an inert non-conductive sleeve located around the portion of said conductor extending through said flange, said sleeve being in direct contact with said conductor, and said flange engaging said sleeve; and
    a non-conductive plastic material located on said flange and extending between said flange and said conductor so as to enclose said end of said housing, said non-conductive plastic material being bonded to at least a part of said housing and to said conductor.

2. In an electrical device having a cylindrical housing formed of a ductile metal, a member positioned within said housing, a conductor attached to said member so as to extend therefrom through an end of said housing, and a liquid located within said housing, a seal for said end of said housing which includes:
    an elastomeric, inert washer supported on said member;
    a continuous internal flange formed of said end of said housing, said flange being curved so that the internal edge thereof is directed generally toward the interior and the bottom of said housing, said flange fitting tightly against said elastomeric washer so as to deform said washer from its normal uncompressed configuration to a compressed configuration in which said washer fits tightly against the interior of said housing adjacent to said end and with respect to said conductor and against said flange;
    an inert electrically non-conductive sleeve located around the portion of said conductor extending through said flange, a metal eyelet fitting tightly against said sleeve so as to be supported thereby, said flange being in direct contact with said eyelet; and
    a non-conductive plastic material located on said flange and extending between said flange and said conductor so as to enclose said end of said housing, said non-conductive plastic material being bonded to at least a part of said housing and to said conductor.

3. In an electrical device having a cup-like housing of ductile metal containing a member and a conductor extending from said member through the center of the open end of said housing, and a liquid located within said housing, a seal for said housing which includes:
    an elastomeric washer supported on said member;
    a continuous internal flange formed on the extremity of said housing defining the open end of said housing, said flange being curved so that the internal edge thereof is directed generally toward the interior and the bottom of said housing, said flange having a wall thickness greater than the thickness of the wall of the remainder of said housing, and fitting tightly against said elastomeric washer so as to hold said washer under compression against the interior of said housing adjacent to said open end and with respect to said conductor, the portions of said elastomeric washer adjacent to said conductor and said flange being held under greater amount of compression than the remainder of said elastomeric washer by said flange, said flange extending closely adjacent to but being spaced from said conductor;

an inert, non-conductive sleeve located around the portion of said conductor extending through said flange in direct contact with said conductor, said flange being in engagement with said sleeve; and a non-conductive plastic material adhered to the outer surface of said housing and to said conductor, said plastic material covering said flange and holding said housing and said conductor to one another.

4. In an electrical device having a cup-like housing of ductile metal containing a member and a conductor extending from said member through the center of the open end of said housing, and a liquid located within said housing, a seal for said housing which includes:

an elastomeric washer supported on said member;

a continuous internal flange formed on the extremity of said housing defining the open end of said housing, said flange being curved so that the internal edge thereof is directed generally toward the interior and the bottom of said housing, said flange having a wall thickness greater than the thickness of the wall of the remainder of said housing, and fitting tightly against said elastomeric washer so as to hold said washer under compression against the interior of said housing adjacent to said open end and with respect to said conductor, the portions of said elastomeric washer adjacent to said conductor and said flange being held under greater amount of compression than the remainder of said elastomeric washer by said flange, said flange extending closely adjacent to but being spaced from said conductor;

an inert electrically non-conductive sleeve located around the portion of said conductor extending through said flange, a metal eyelet fitting tightly against said sleeve so as to be supported thereby, said flange being in direct contact with said eyelet; and a none-conductive plastic material adhered to the outer surface of said housing and to said conductor, said plastic material covering said flange and holding said housing and said conductor to one another.

References Cited by the Examiner

UNITED STATES PATENTS

| | | | |
|---|---|---|---|
| 2,028,564 | 1/1936 | Robinson et al. | 174—52 |
| 2,113,405 | 4/1938 | Junken | 317—230 |
| 2,213,209 | 9/1940 | De Lange et al. | 317—230 |
| 2,443,545 | 6/1948 | Schwennesen | 174—18 |
| 2,611,793 | 9/1952 | Simpson | 174—52 |
| 2,617,863 | 11/1952 | Stinson | 174—50 X |
| 2,739,275 | 3/1956 | Houtz et al. | 317—230 |
| 2,834,926 | 5/1958 | Booe | 317—230 |
| 2,862,157 | 11/1958 | Haring et al. | 317—230 |
| 2,891,362 | 6/1959 | Bettridge | 53—37 |
| 3,056,072 | 9/1962 | Schroeder et al. | 317—230 |
| 3,124,727 | 3/1964 | Murray | 317—242 X |

ROBERT K. SCHAEFER, *Primary Examiner.*

RUDOLPH V. ROLINEC, JOHN P. WILDMAN, E. JAMES SAX, LARAMIE E. ASKIN, *Examiners.*

R. O. MARRITZ, R. F. ROTELLA, *Assistant Examiners.*